Patented Feb. 18, 1936

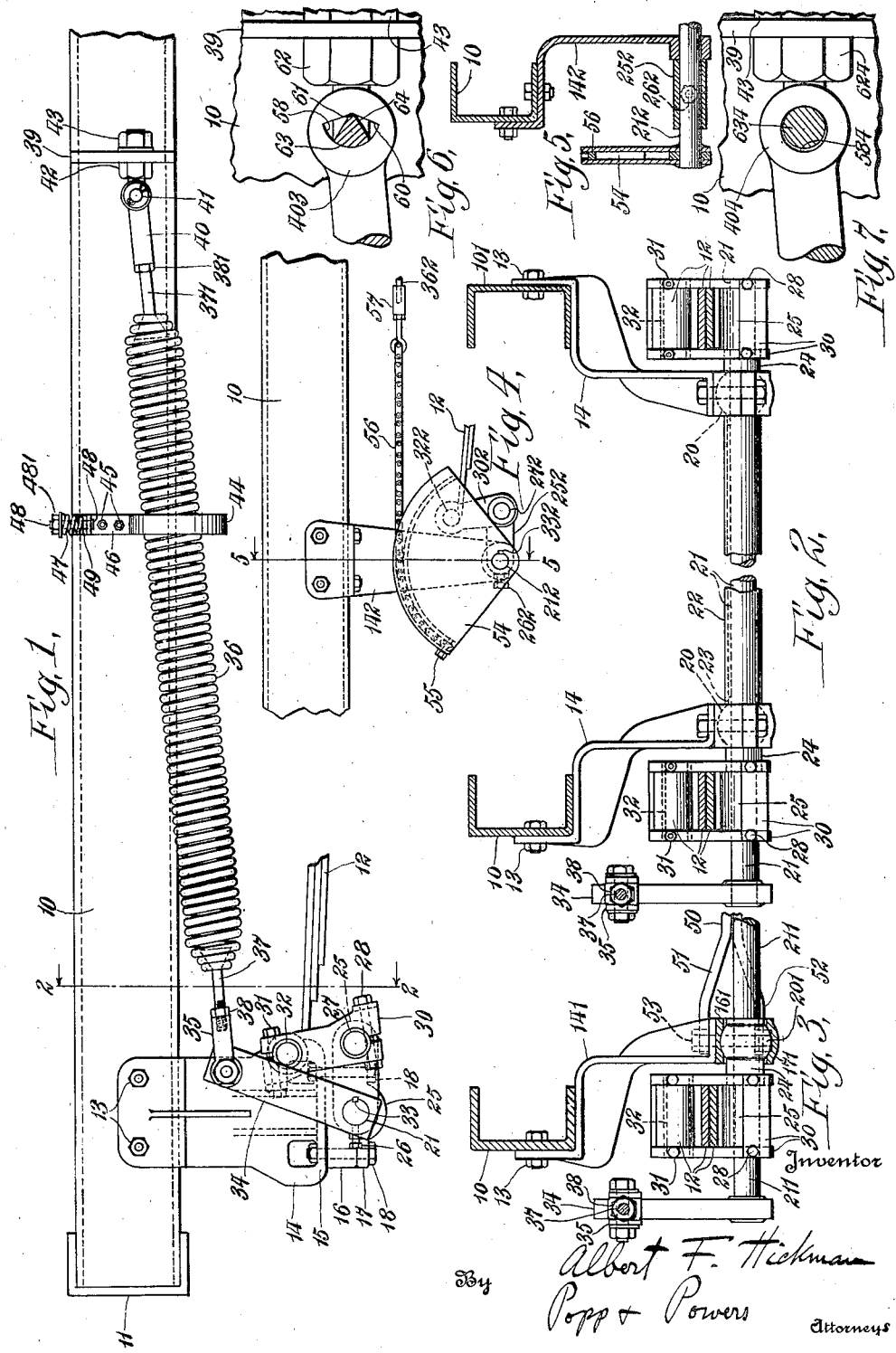

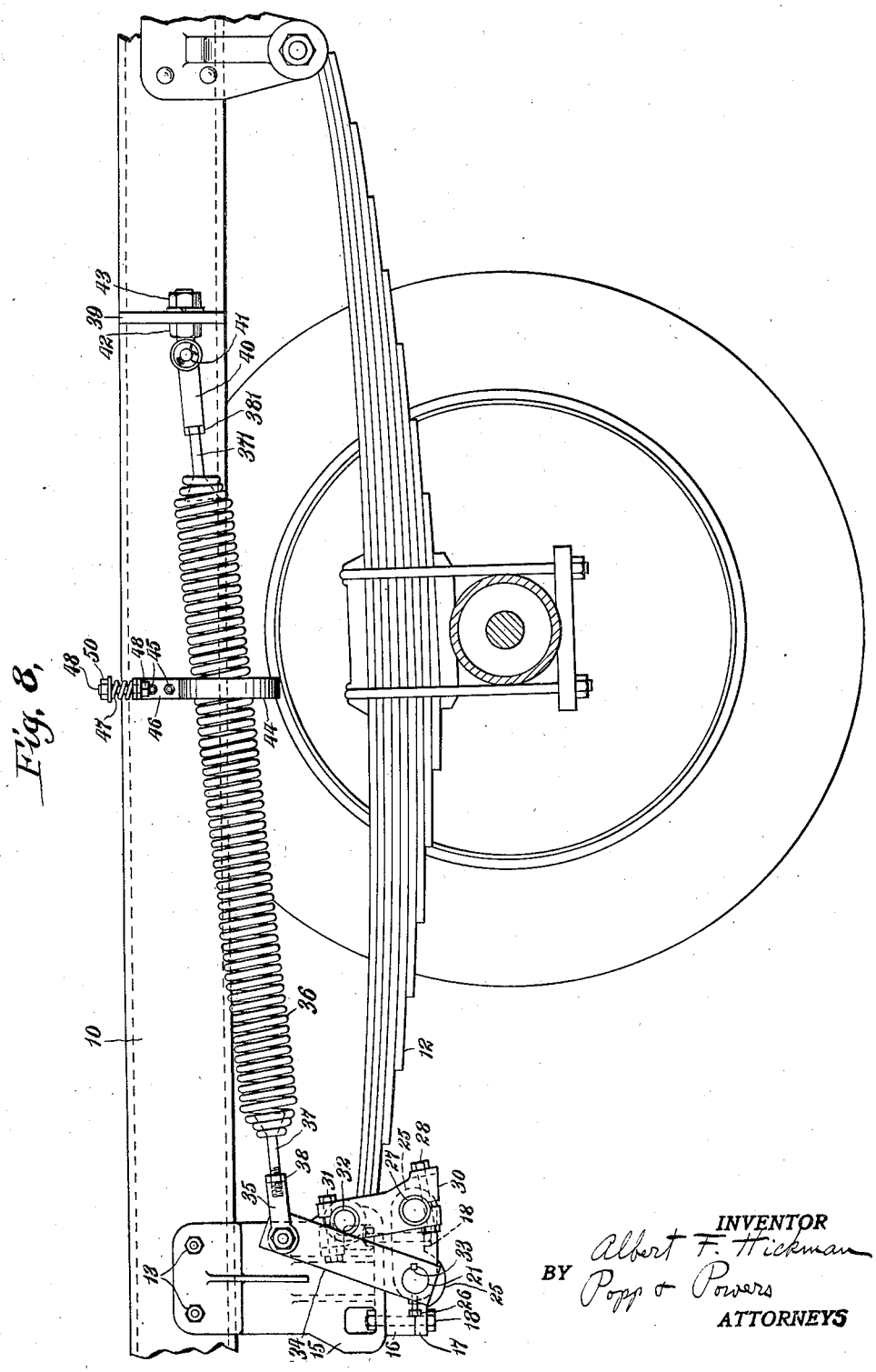

2,031,482

UNITED STATES PATENT OFFICE 2,031,482

VEHICLE SPRING SUSPENSION

Albert F. Hickman, Eden, N. Y., assignor to Hickman Pneumatic Seat Co., Inc., Eden, N. Y., a corporation of New York Application November 2, 1931, Serial No. 572,549

4 Claims. (Cl. 280—124)

This invention relates to a spring suspension for vehicles and particularly relates to an automobile spring suspension in which a pair of vehicle springs on opposite sides of the chassis are connected to a common rock shaft journaled in the vehicle frame.

The principal objects of the invention are, (1) to prevent weaving of the chassis frame from interfering with the free action of the spring suspension, (2) to prevent lateral vibration of the springs associated with the spring suspension, due to periodic vibration of the springs which are foreign to their individual operation (periodic vibration of the adjacent part of the vehicle chassis), (3) to prevent such lateral vibration without setting up a periodic vibration in the springs themselves, and (4) to substitute either rolling or knife edge connections in place of the usual frictionally rubbing pivots of the parts associated with the spring suspension.

Numerous other objects of the invention and practical solutions thereof are disclosed in detail in the herein patent specification wherein:

In the accompanying drawings:

Figure 1 is a fragmentary side elevation of the rear of an automobile chassis illustrating my invention as installed thereon.

Figure 2 is a fragmentary, vertical transverse section thereof taken on line 2—2, Fig. 1.

Figure 3 is a similar fragmentary, vertical transverse section but showing a modified cross brace construction.

Figure 4 is a fragmentary, side elevation similar to Fig. 1 but showing a modified means of connecting the secondary spring to the rock shaft.

Figure 5 is a vertical, transverse section thereof taken on line 5—5, Fig. 4.

Figures 6 and 7 are enlarged, fragmentary side elevations showing a portion of the construction of Fig. 1 in modified form.

Fig. 8 is a reduced-scale, fragmentary, vertical, longitudinal section through the rear of the automobile, illustrating the general organization of the spring suspension, wheel, axle, etc.

In the following description similar characters of reference indicate like parts in the several figures of the drawings.

My invention may be embodied in various forms and in spring suspensions of different constructions, and the present applications are therefore to be regarded merely as a small number of the possible organizations which come within the scope of my invention and satisfactorily carry out the function of same in practice. As here shown (and referring for the present to only Figs. 1 and 2) the same is constructed as follows:

The herein invention is a variant of my copending application for Vehicle spring and shock absorber suspension, Serial Number 497,653, filed November 24, 1930.

The numerals 10 and 101 indicate the horizontal, longitudinal frame bars of a typical automobile chassis. To the extreme rear ends of said side frame bars is secured a rear cross frame bar 11 which connects the same together and retains the same in proper spaced relationship. It is to be understood that the usual automobile or other vehicle body (not shown) is mounted upon the chassis frame which is constituted of said frame bars 10, 101, and 11, and that said chassis is supported by the usual front and rear vehicle axles which are provided with ground wheels in the conventional and well known manner, the rear axle being suitably secured to the intermediate portion of the semi-elliptic rear spring 12 (see Fig. 8). The present invention is, not, however, confined to use in conjunction with a rear axle, inasmuch as it is adapted for use with either or both the front and rear axles,—but the invention has been shown as used at the rear end of the automobile chassis merely for purposes of illustrating its principle of operation.

Secured by bolts 13 to said channel-beam side frame bars 10, 101 and projecting downwardly and inwardly therefrom are a pair of suitably webbed brackets 14. Against the lower face of the lower, horizontal flange 15 of each of said brackets is secured a pair of ball and socket bearing sections 16 and 17 which constitute a split ball and socket bearing, and are clamped together and to said flange 15 by bolts 18 or otherwise. Gyratorily arranged within the spherical bore of each of said ball and socket bearing sections 16, 17 is a ball and socket sleeve 20 in which is oscillatorily journaled a horizontal transverse rock shaft 21. Concentrically mounted with respect to said pair of ball and socket sleeves 20 and said rock shaft 21 is a thrust tube 22 which encloses the central part of but is out of contact with said rock shaft 21. The latter has received within the extreme outer opposite ends of its bore the inner, annular hubs 23 of aforesaid ball and socket sleeves 20. The transverse end faces of said thrust tube 22 bear against the shoulders which are formed at the inner ends of said hubs 23, so that said ball and socket sleeves are retained in properly spaced relation as far as inward movement toward each other is concerned. This arrangement prevents any weaving of the chassis frame from interfering with the smooth turning of the rock shaft 21 within the bores of the ball and socket sleeves 20 which might otherwise be interfered with by the inward movement of said brackets 14 toward each other. For instance, if one of the wheels of the vehicle hits an obstruction or drops into a hole and thereby causes a weaving of the chassis side frame bars 10 and 101 so that the lower ends of the brackets 14 tend to move inwardly with respect to each other, such a tendency is resisted by said thrust tube 22 by reason of its consequent end pressure against the ball and socket sleeves 20 which latter are, in turn, restrained against transverse movement by reason of their spherical engagement with their companion ball and socket bearing sections 16 and 17.

The outer end of each ball and socket bearing sleeve 20 is also provided with an outer annular hub 24 against the outer face of which bears the inner vertical face of an arm 25 which is mounted on and is rigidly secured to the rock shaft 21 in any suitable manner, as by a set screw 26. By this arrangement, the two ball and socket sleeves are confined between said arms 25, and hence any tendency of the lower ends of the brackets 14 to spread apart or away from each other is prevented. It has been previously shown that inward movement of the lower ends of the brackets toward each other is prevented because of the thrust tube 22, and, as a consequence of the arrangement taken as a whole, the center to center distance between the spherical portions of the ball and socket sleeves 20 is maintained constant irrespective of the weave of the chassis frame in whatsoever direction it may tend to become distorted.

Rotatably arranged at the front end of each arm 25 is a pivot pin 27 to the outer end of which is clamped (by clamp bolts 28) the lower end of a bifurcated shackle 30. In the upper end of said shackle is similarly secured, by clamp bolts 31, the outer ends of a pivot pin 32, the central part of which is suitably journaled in the rear end of the rear, laminated leaf spring 12 aforementioned. It is thus seen that either an upward or a downward pressure on said rear spring 12 (exerted by the rear axle) causes a rotation in the one or other direction of the rock shaft 21.

Secured by a key 33 or otherwise to one of the outboard ends of said rock shaft 22 is an upstanding rock arm 34 to the upper end of which is pivoted a clevis 35. The latter is adjustably connected with the rear tapered end of a helical secondary spring 36 through the intermediary of a rear socket bolt 37 which is threaded into said clevis 35 and has its adjustable position with respect thereto secured by a lock nut 38. Arranged at the front tapered end of said secondary spring 36 is a front socket bolt 371 which is similarly adjustably threaded into a front clevis 40 and is likewise secured in adjusted position relatively thereto by a lock nut 381. The front end of said clevis 40 (in the construction of Figs. 1 and 2) is pivotally connected at 41 to a pivot head 42 which is secured to a flange 39 on the chassis frame bar 10 by a clamp nut 43 threaded onto its front end.

Located intermediately of the length of the secondary helical spring 36, and preferably at the percussion point (center of theoretical oscillation) thereof, is an anti-vibration strap 44 which normally encircles but is out of contact with said helical secondary spring 36. The two upper ends of said strap are rigidly secured together by a pair of clamp bolts 45 and are also mutually secured thereby to an L shaped supporting arm 46, the upper horizontal flange of which, due to the influence of a compression spring 47, is resiliently urged upwardly against the lower face of a bracket 49 which extends horizontally out from and is secured to the side frame bar 10 of the vehicle chassis. The tension of said compression spring 47 is rendered adjustable by means of a spring adjustment bolt 48, the head of which bears against the lower face of said supporting arm 46 and the nut 481 of which bears against the upper end of said compression spring 47. It has been found advisable in actual practice to tighten the nut 481 so as to put a considerably initial tension on said spring 47 so as to prevent vibration of the strap 44 relatively to the bracket 49 and to also impose a periodic vibration due to said spring 47 which is different from the periodic vibration of the strap 44 and secondary spring 36.

In the construction shown in Figs. 1 and 2, it is manifest that the upstanding rock arm 34 (because of the circular path of the pivot of clevis 35) causes a certain amount of lateral vibration of the helical secondary spring 36 which vibration may become very excessive if it happens to be in synchronism with the period of vibration of the entire vehicle at any particular period of time. It is with the object of preventing excessive lateral synchronous movement of said secondary spring 36 relatively to the chassis frame that the strap 44 (and its associated parts) is provided, said strap only becoming effective occasionally, whenever said synchronous vibrations are approximately in phase with each other. When this occurs, a very violent strain is sometimes imposed upon the anti-vibration strap 44, and it is for the particular condition which occurs at such a time that the compression spring 47, etc. is provided, said spring causing not only a softening action of the forces imposed against said strap 44 but also tending to cause a period of vibration which is out of tune with the particular period of vibration of said secondary spring 36 existing at the time. It is to be understood that, under average conditions, the anti-vibration strap is entirely without function and that it does not, under such average working conditions, come in contact with said helical secondary spring 36 at all. It is only when the periodic vibrations of said secondary spring 36 and the chassis frame are in more or less exact synchronism with each other that a tendency exists to cause a very violent lateral oscillation of said secondary spring relatively to said chassis frame and it is this tendency at such a time only which is prevented by reason of the strap 44.

One modification of the invention is shown in Fig. 3. In this construction the thrust tube 22 is eliminated, and the ball and socket sleeves 201 relieved of all end thrust except that imposed by the rock shaft 211 itself. This is accomplished by means of a brace 50, the opposite ends of which are bifurcated so as to give the whole brace the approximate shape of the letter "X" having the diagonal end members or arms 51 and 52 which are suitably secured to the lower part of their companion bracket 141 by the same bolt 53 which also serves to secure the ball and socket bearing sections 161 and 171 to the lower face of their companion bracket 141. This brace 50 assures that the lower ends of companion brackets 141 will be kept accurately in proper spaced relation to each other. It also, by reason of its diagonal construction, holds each of the brackets 141 at right angles to the rock shaft 211 or, in other words, holds said rock shaft in fixed angular relationship to each of said brackets. This substantially eliminates the wear of the ball and socket sleeves 201 in their spherical bearings and also operates to stiffen the chassis frame by preventing a translatory vertical movement of the one chassis frame bar 10 relatively to its companion frame bar 101, this being the sort of weaving which is the most likely to occur in an automobile chassis frame as at present usually constructed.

Another modification of the invention is shown in Fig. 4. In this construction the rock arm 34 (Figs. 1-3) is replaced by a pulley wheel segment 54, the periphery of which is obviously at a constant distance from the rock shaft 212 to which it is secured by a key 332. Secured by a cap screw 55 or otherwise at the rear end of the peripheral surface of said pulley wheel segment 54 is a chain belt or other flexible member 56 which bears against the annular periphery of said segment and is secured at its forward end to a turnbuckle 57 which is in turn secured to the rear end of a secondary spring 362 in a manner analogous to that shown in Fig. 1. The employment of such a pulley wheel segment 54 and flexible member 56 prevents an up or down movement being imposed upon the rear end of the secondary spring 362 due to an oscillation in the one or other direction of the rock shaft 212. This prevents the whipping action at the rear end of said secondary spring and eliminates the need of the anti-vibration strap 44 of Fig. 1 and its associated parts.

In Fig. 6 is shown one modified method of connecting the front end of the secondary spring with the chassis frame. In this construction the clevis 40 of Fig. 1 is replaced by a rocking eye 403, the front or outer end of which is circularly enlarged and is centrally broached to form a segmental rocking aperture 58, the rear part of which is semi-circular and the front part of which consists of a pair of flat faces 60 arranged at a dihedral angle and meeting in a crotch 61 constituting the axis of the entire segmental rocking aperture 58. Oscillatorily arranged with said rocking aperture 58 is a rocking head 62 provided with a horizontal transverse rocking bar 63 of segmental cross section, said rocking bar having its rear face of cylindrical form to engage with the cylindrical portion of said rocking aperture 58 and having its front portion beveled to form a knife edge 64 which rests and rocks in the crotch 61 of the rocking eye 403. The entire rocking head 62 with its rocking bar 63 is secured to the flange 39 of the chassis frame, the front end of said bar passing through said flange and being threaded to receive the clamp nut 43 in a manner similar to that illustrated in Fig. 1.

This method (Fig. 6) of connecting the rocking eye 403 with the chassis frame permits a small oscillatory relative movement between said frame and eye without imposing any frictional resistance against such a movement. This result is effected by reason of the rocking engagement of the knife edge 64 with the crotch 61 of the rocking eye 403.

In Fig. 7 is shown another modified method of connecting the rocking eye 404 with the chassis frame in a very inexpensive and yet satisfactory manner. In this construction the rocking aperture 584 is annular instead of segmental as in Fig. 6. The rocking bar 634 of the rocking head 624 is, in this case, of cylindrical cross section, the diameter of which is considerably less than the diameter of the bore of the cylindrical rocking aperture 584. The consequence of this arrangement is that a result is obtained approximately equivalent to that shown in Fig. 6, the connection between said rocking eye 404 and the chassis frame being one of pure rolling and hence devoid of frictional resistance due to the movement of one surface relatively to another with which it is in contact. Such a construction, to be sure, is only applicable where the oscillatory movement between the parts is relatively small. Nevertheless, when such a condition does actually exist, it is of unquestionable value to eliminate the frictional resistance which would be imposed against said movement if a frictional instead of a rocking connection were employed.

I claim:

1. A vehicle spring suspension comprising a chassis frame; a rock shaft bearing secured to each side of said frame; a rock shaft journaled in said bearings; a cross brace having forked ends which are secured to said bearings whereby the same are held in fixed angular relationship relatively to said frame irrespective of the tendency of said frame to weave; vehicle springs operatively connected with the outer ends of said rock shaft; and a vehicle axle provided with wheels secured to said springs.

2. A vehicle spring suspension comprising a chassis frame; brackets extending from said frame; a rock shaft journaled in said brackets; a cross brace having forked ends which are connecting said brackets; vehicle springs operatively connected with the outer ends of said rock shaft; and a vehicle axle provided with wheels secured to said springs.

3. A vehicle spring suspension comprising a chassis frame; brackets extending from said frame; ball and socket bearings arranged in said brackets; means for retaining the outer ends of said brackets in permanently spaced relation with respect to each other; a rock shaft journaled in said bearings; vehicle springs operatively connected with the outer ends of said shaft; an axle provided with wheels supporting said springs.

4. A vehicle spring suspension comprising a chassis frame; brackets extending from said frame; ball and socket bearings arranged in said brackets; a cross brace having forked ends which are connecting the outer ends of said brackets; a rock shaft journaled in said bearings; a vehicle spring operatively connected with said shaft; and an axle provided with wheels supporting said spring.

ALBERT F. HICKMAN.